(12) United States Patent
Huang

(10) Patent No.: US 12,417,547 B2
(45) Date of Patent: Sep. 16, 2025

(54) OBJECT CLASSIFYING AND TRACKING METHOD AND SURVEILLANCE CAMERA

(71) Applicant: ViVOTEK INC., New Taipei (TW)

(72) Inventor: Chao-Tan Huang, New Taipei (TW)

(73) Assignee: VIVOTEK INC., New Taipei (TW)

( * ) Notice: Subject to any disclaimer, the term of this patent is extended or adjusted under 35 U.S.C. 154(b) by 465 days.

(21) Appl. No.: 18/070,476

(22) Filed: Nov. 29, 2022

(65) Prior Publication Data
US 2023/0169664 A1 Jun. 1, 2023

(30) Foreign Application Priority Data
Dec. 1, 2021 (TW) ................................. 110144820

(51) Int. Cl.
| | |
|---|---|
| *G06T 7/246* | (2017.01) |
| *G06V 10/74* | (2022.01) |
| *G06V 10/764* | (2022.01) |
| *G06V 20/52* | (2022.01) |

(52) U.S. Cl.
CPC ............ *G06T 7/248* (2017.01); *G06V 10/761* (2022.01); *G06V 10/764* (2022.01); *G06V 20/52* (2022.01); *G06T 2207/30232* (2013.01)

(58) Field of Classification Search
CPC ...................... G06T 7/248; G06T 7/246; G06T 2207/30232; G06V 10/761; G06V 10/764; G06V 10/454; G06V 10/7715; G06V 10/62; G06V 20/52
See application file for complete search history.

(56) References Cited

U.S. PATENT DOCUMENTS

| | | | |
|---|---|---|---|
| 2013/0051624 A1* | 2/2013 | Iwasaki | G06V 10/255 382/103 |
| 2017/0132334 A1* | 5/2017 | Levinson | B60W 50/00 |
| 2019/0333232 A1* | 10/2019 | Vallespi-Gonzalez | G06N 5/01 |
| 2024/0412385 A1* | 12/2024 | Yamazaki | G06T 7/20 |

\* cited by examiner

*Primary Examiner* — John B Strege
(74) *Attorney, Agent, or Firm* — Winston Hsu

(57) ABSTRACT

An object classifying and tracking method is applied to an image stream acquired by a surveillance camera for object identification. The object classifying and tracking method includes acquiring a first classify feature and a first dependent feature of a first target object in a first image of the image stream and a second classify feature and a second dependent feature of a second target object in a second image of the image stream, acquiring a dependent degree of the first classify feature and the second classify feature from a memory, transforming the second dependent feature via the dependent degree, and analyzing the first dependent feature and the transformed second dependent feature to determine whether the first target object and the second target object are the same object.

20 Claims, 6 Drawing Sheets

OBJECT CLASSIFYING AND TRACKING METHOD AND SURVEILLANCE CAMERA

BACKGROUND OF THE INVENTION

1. Field of the Invention

The present invention relates to an object classifying and tracking method and a surveillance camera, and more particularly, to an object classifying and tracking method of accurately identify similar objects and a related surveillance camera.

2. Description of the Prior Art

Conventional image recognition technology analyzes certain features of target objects within the surveillance image, so as to find a moving path of the target object in a plurality of continuous surveillance images for an aim of an object tracking function. However, the target object may change its angle towards the camera during the movement, such as rotation or tilt, or the target object may be partly occluded by other objects during the movement, such as by a pillar or a vehicle, or the target object may move to a structure with similar height, such as a pedestrian walking by the clothing on the stand. Above-mentioned situations may cause misjudgment of the conventional image recognition technology. Therefore, design of an object classification and tracking technology of increasing identification results is an important issue in the related surveillance industry.

SUMMARY OF THE INVENTION

The present invention provides an object classifying and tracking method of accurately identify similar objects and a related surveillance camera for solving above drawbacks.

According to the claimed invention, an object classifying and tracking method is applied for object identification of an image stream. The object classifying and tracking method includes an operation processor acquiring a first classify feature and a first dependent feature of a first target object within a first image of the image stream and a second classify feature and a second dependent feature of a second target object within a second image of the image stream, the operation processor acquiring a dependent degree of the first classify feature and the second classify feature from a memory, the operation processor utilizing the dependent degree to transform the second dependent feature, and the operation processor analyzing the first dependent feature and the transformed second dependent feature to determine whether the first target object and the second target object are the same tracking object.

According to the claimed invention, a surveillance camera with an object classifying and tracking function includes an image receiver, a memory and an operation processor. The image receiver is adapted to receive an image stream. The memory is adapted to store a dependent table having at least one dependent degree between a plurality of target objects. The operation processor is electrically connected to the image receiver and the memory. The operation processor acquires a first classify feature and a first dependent feature of a first target object within a first image of the image stream and a second classify feature and a second dependent feature of a second target object within a second image of the image stream, acquires a dependent degree of the first classify feature and the second classify feature from the memory, utilizing the dependent degree to transform the second dependent feature, and analyzes the first dependent feature and the transformed second dependent feature to determine whether the first target object and the second target object are the same tracking object.

The object classifying and tracking method and the surveillance camera of the present application can utilize the dependent degree in different types to transform and acquire the dependent feature of different target objects, so as to determine plural results of the object identification with similar shape belong to the same type or different types, for preferred object classification and accurate tracking result. Comparing to the prior art, the object classifying and tracking method and the surveillance camera of the present application do not need complicated computation and extensive data storage, and can accurately identify the objects that have similar shapes but are in different types, such as difference between the container and the truck, or difference between the human and the clothing on the stand, so as to provide the object classifying and tracking result rapidly and accurately.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
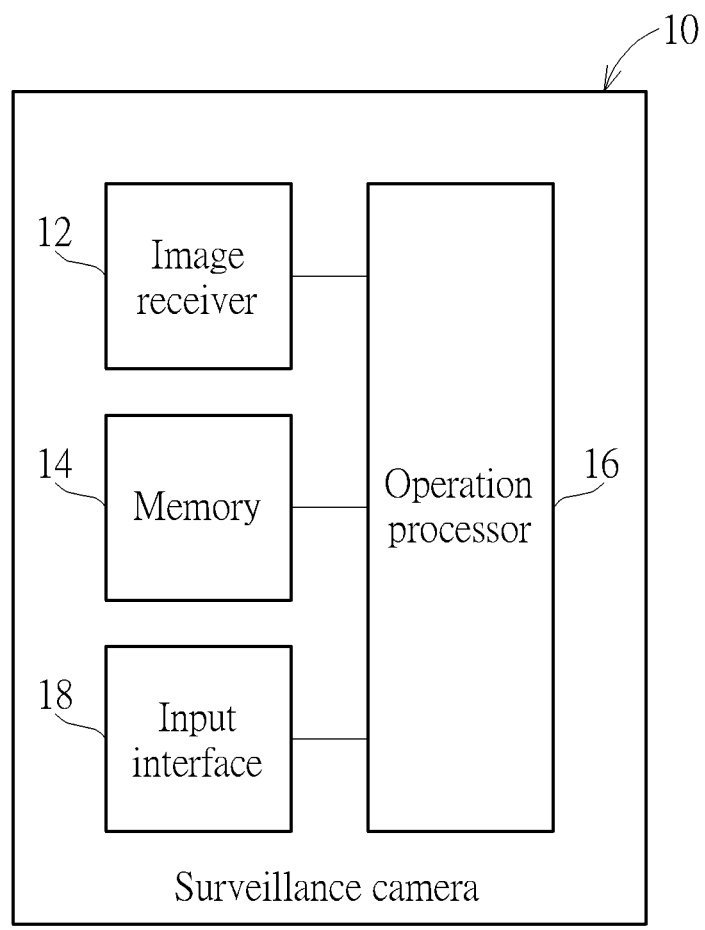
FIG. 1 is a functional block diagram of a surveillance camera according to an embodiment of the present application.

Please refer to FIG. 1. FIG. 1 is a functional block diagram of a surveillance camera 10 according to an embodiment of the present application. The surveillance camera 10 can be disposed on interior space or outdoor space, such as on the road or in the shop, and used to classify and track a target object appeared within a surveillance area of the surveillance camera 10. If the surveillance camera 10 is disposed in the outdoor space, such as one the road, a pedestrian, a container and a truck may be in the surveillance area; if the surveillance camera 10 is disposed in the interior space, such as in the shop, the pedestrian and clothing on a stand may be in the surveillance area. The surveillance camera 10 can execute an object classifying and tracking method of the present application to accurately and rapidly identify a difference between the container and the truck, and a difference between the pedestrian and the clothing, so as to provide correct object tracking information.

Figure 2:
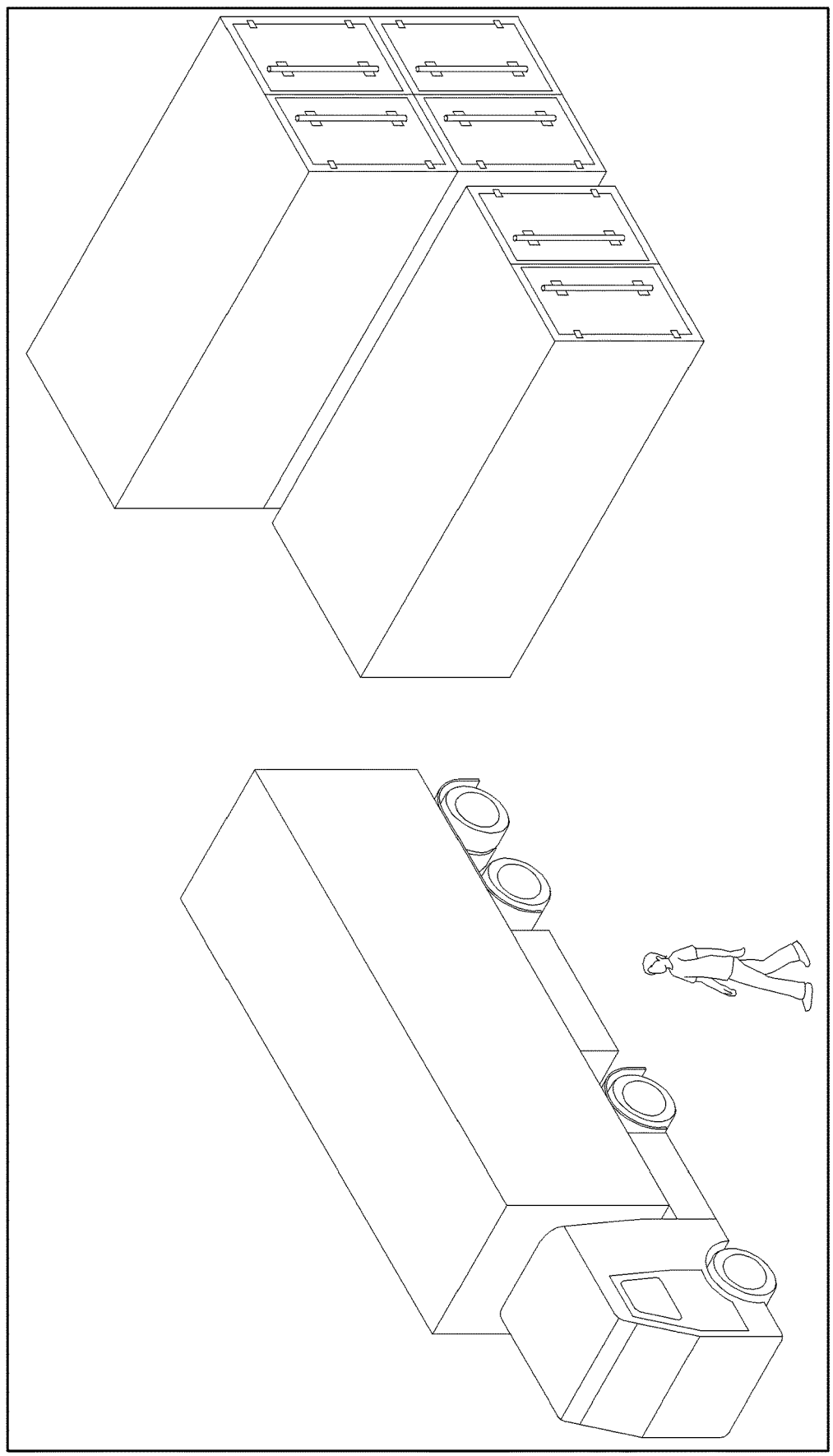
FIG. 2 is a diagram of a surveillance image acquired by the surveillance camera installed on the outdoor space according to the embodiment of the present application.
Figure 3:
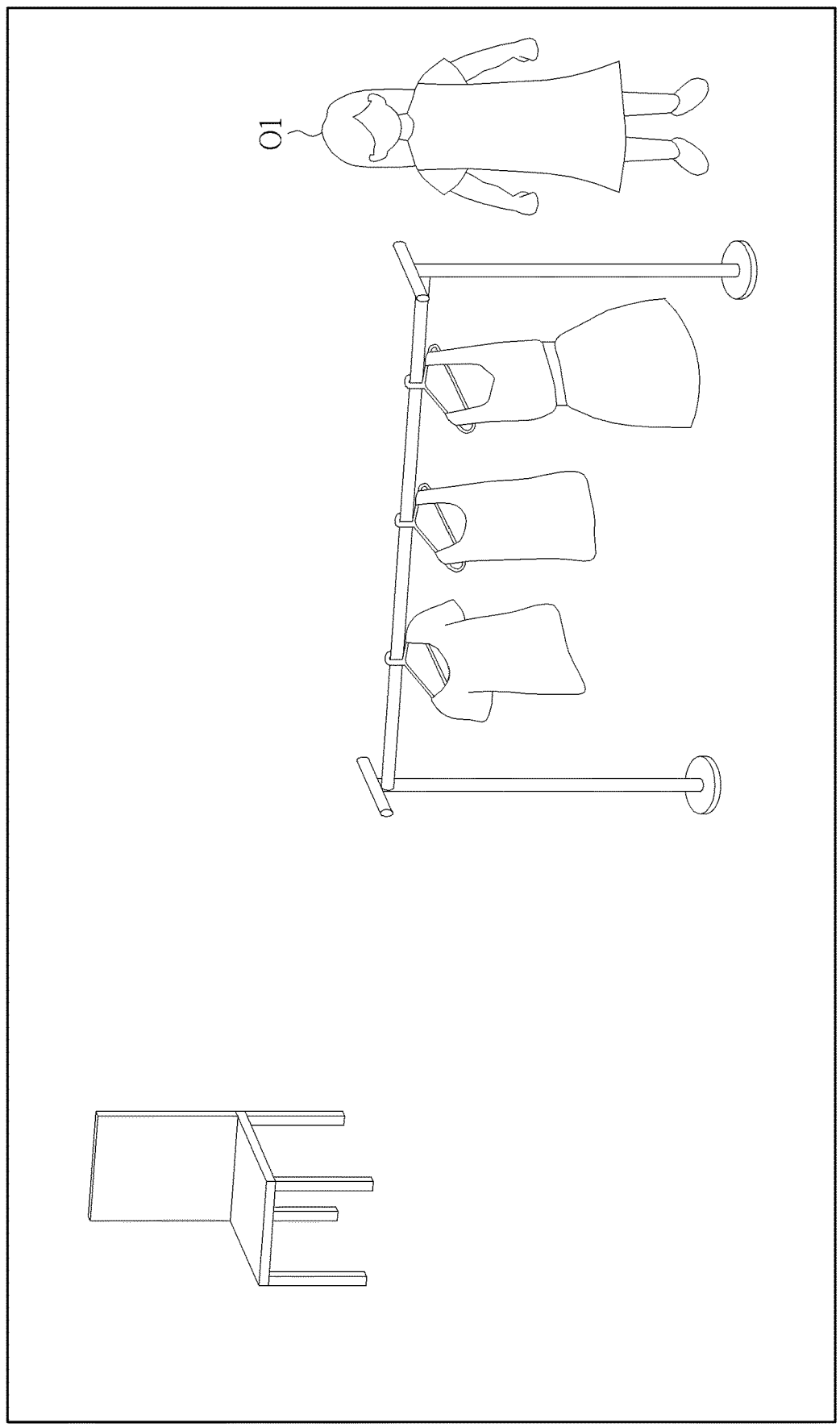
FIG. 3 is a diagram of the surveillance image acquired by the surveillance camera installed on the interior space according to the embodiment of the present application.

Please refer to FIG. 2 and FIG. 3. FIG. 2 is a diagram of a surveillance image I acquired by the surveillance camera 10 installed on the outdoor space according to the embodiment of the present application. FIG. 3 is a diagram of the surveillance image I1 acquired by the surveillance camera 10 installed on the interior space according to the embodiment of the present application. In the surveillance image I, the surveillance camera 10 can accurately identify a difference between the truck and the pedestrian because features of the truck are obviously different from features of the pedestrian; however, conventional object identification technology cannot identify a difference between the container and the truck, and the observer has to search specific features, such as the front or the tire of the truck, for identifying the said difference. The object classifying and tracking method of the present application can accurately and rapidly identify the difference between the container and the truck.

In the surveillance image I1, features of the pedestrian may be similar to features of the clothing on the stand. Although the pedestrian has specific features, such as the head and the hand, a ratio of an upper body (where the clothing is wore) to a lower body of the pedestrian is high, so that the conventional object identification technology cannot identify the difference between the pedestrian and the clothing on the stand. Therefore, the object classifying and tracking method of the present application can be applied for the surveillance camera 10 to analyze similarity and dependency of the pedestrian and the clothing on the stand, so as to accurately and rapidly identify the difference between the pedestrian and the clothing on the stand.

The surveillance camera 10 can include an image receiver 12, a memory 14 and an operation processor 16. The image receiver 12 can capture the image stream, or receive the image stream captured by an external camera. The image stream can have a series of surveillance images captured in a sequence. The memory 14 can store a dependent table containing dependent degrees about the plurality of target objects. As the embodiments shown in FIG. 2 and FIG. 3, the target object can be the pedestrian, the clothing on the stand, the container or the truck; types of the target object are not limited to the above-mentioned embodiment, and can be changed in accordance with environment where the surveillance camera 10 is located. The target objects in different types can have related dependent degrees, and the said dependent degrees can be used to set the dependent table. The operation processor 16 can be electrically connected to the image receiver 12 and the memory 14, and execute the object classifying and tracking method of the present application to analyze the image stream via the dependent table.

In the present application, if the object classifying and tracking method defines the pedestrian as a first target object O1 and further defines the clothing on the stand as a second target object O2, a first classify feature C1 of the first target object O1 can be the human, and a second classify feature C2 of the second target object O2 can be the clothing; the classify features can be set manually, or automatically analyzed and set by the surveillance camera 10 via specific identification technology. The object classifying and tracking method of the present application can compute a pixel number ratio of the first classify feature C1 to the second classify feature C2, and store the computed pixel number ratio into the dependent table in the memory 14 for being the dependent degree of the human and the clothing. For example, the ratio of the clothing to the upper body of the pedestrian may be eighty percent, and the dependent degree of the human and the clothing can be set as 0.8; application of setting of the dependent degree is not limited to the above-mentioned embodiment. The object classifying and tracking method of the present application can track a large number of the target objects, and the dependent degree is not limited to relation between two target objects.

Besides, the object classifying and tracking method may further acquire a first attribute feature A1 of the first target object O1 and a second attribute feature A2 of the second target object O2. The attribute features can be vector features of color, a height, dimensions and a shape of the target object. The attribute features can be set manually, or be analyzed and set by the specific identification technology of the surveillance camera 10. For example, the attribute features can be optionally defined as four vector attributes of the sleeve, the collar, the face and the tire for identifying difference between the pedestrian, the clothing on the stand, and the truck; application of the vector attributes is not limited to the above-mentioned embodiment, and depends on an actual demand. Then, the object classifying and tracking method can compute a vector included angle between the first attribute feature A1 and the second attribute feature A2, or vector lengths of the first attribute feature A1 and the second attribute feature A2, and store the vector included angle or the vector lengths into the dependent table in the memory 14 for being the dependent degree of the human and the clothing. The dependent degree of the human and the truck, and the dependent degree of the clothing and the truck can be computed via the foresaid method, and a detailed description is omitted herein for simplicity.

Figure 4:
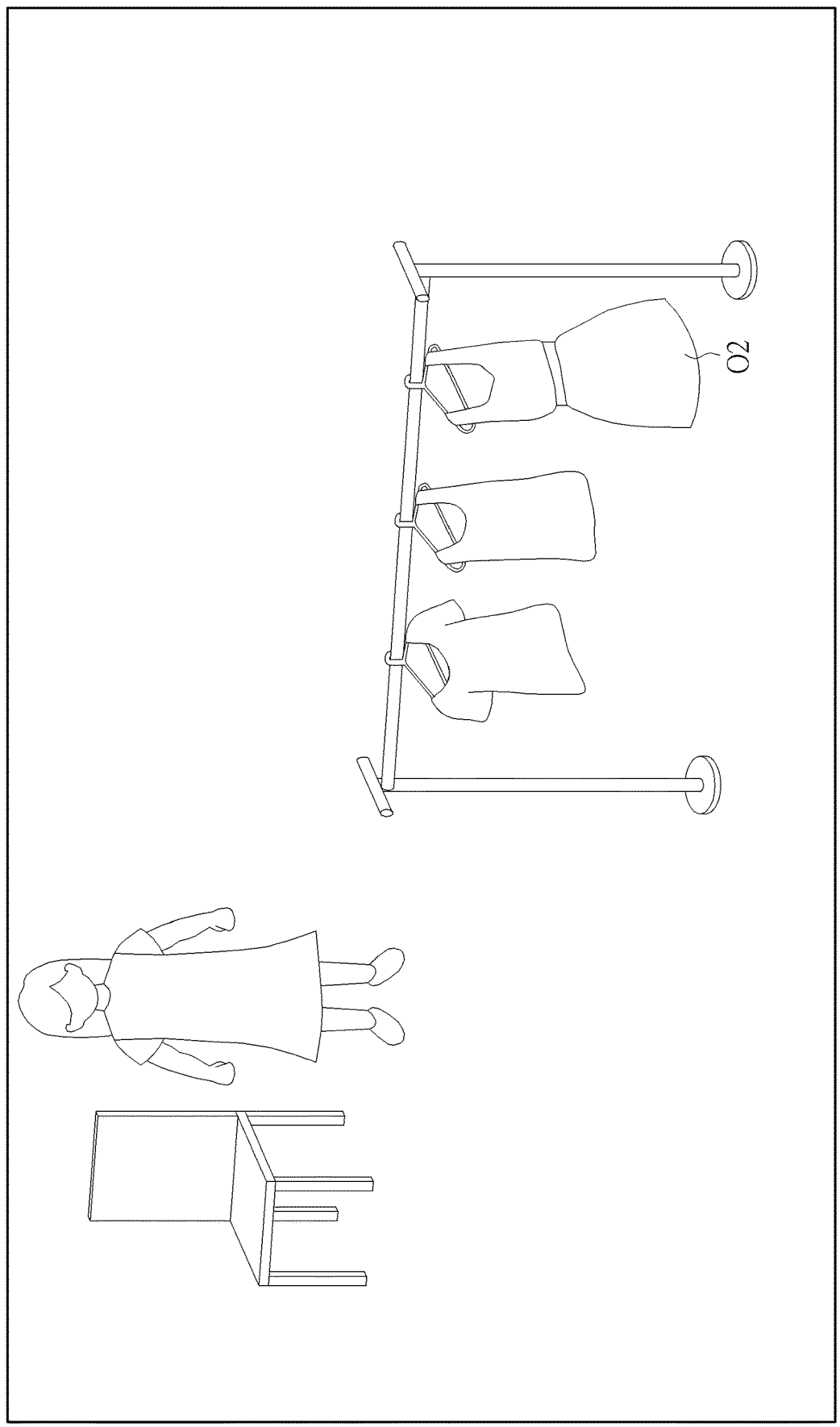
FIG. 4 is a diagram of another surveillance image acquired by the surveillance camera stored in the interior space according to the embodiment of the present application.
Figure 5:
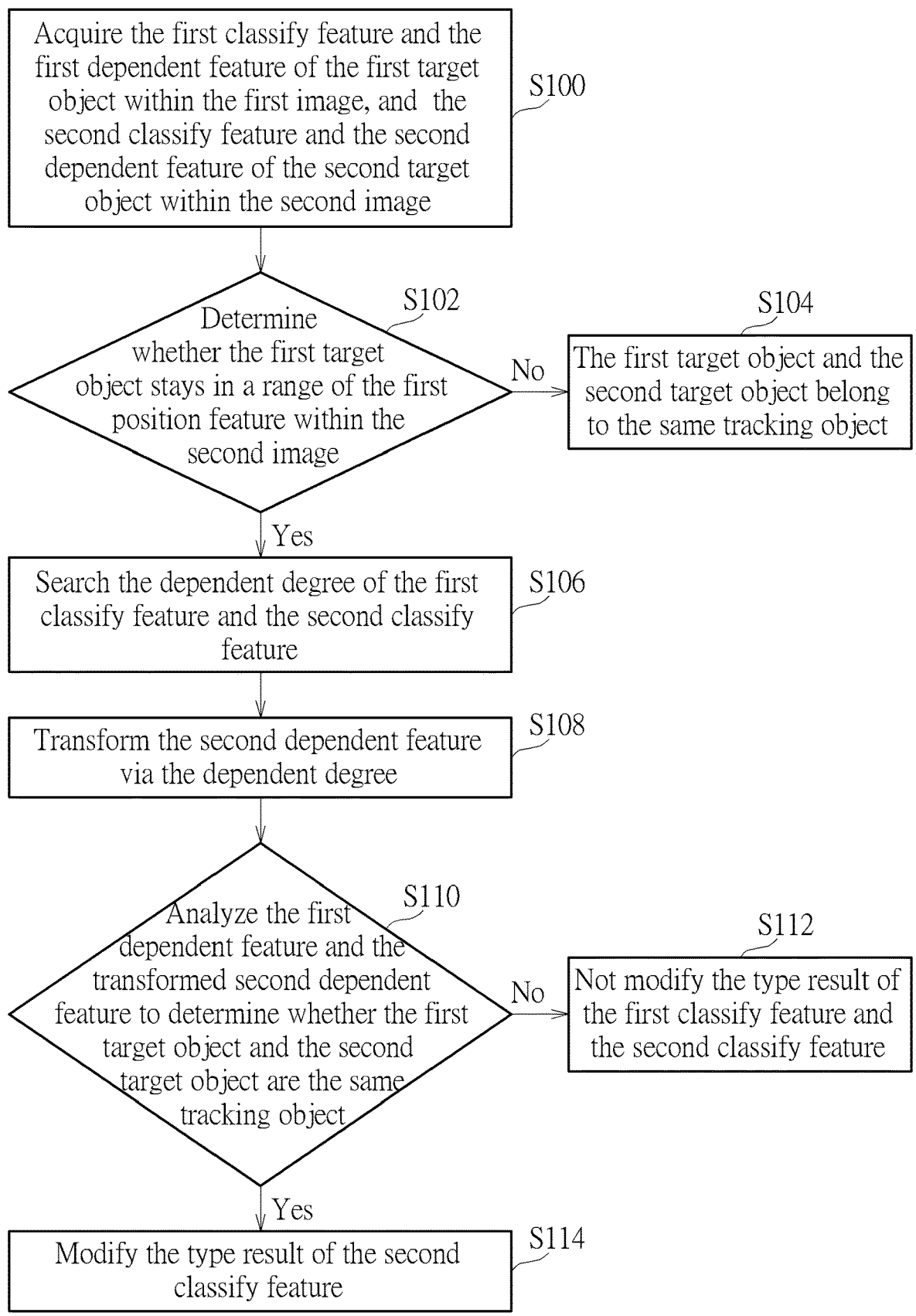
FIG. 5 is a flow chart of the object classifying and tracking method according to the embodiment of the present application.

Please refer to FIG. 4 and FIG. 5. FIG. 4 is a diagram of another surveillance image I2 acquired by the surveillance camera 10 stored in the interior space according to the embodiment of the present application. FIG. 5 is a flow chart of the object classifying and tracking method according to the embodiment of the present application. The surveillance image I1 and the surveillance image I2 can be two continuous images or discontinuous images of the image stream sequentially acquired in different points of time, and can be redefined as the first image I1 and the second image I2, and a capturing point of time of the second image I2 can be later than a capturing point of time of the first image I1. The first target object O1 within the surveillance area may move away from an original position, such as moving from the clothes stand shown in the first image I1 to the chair shown in the second image I2; the surveillance camera 10 can detect the second target object O2 by the clothes stand within the second image I2, and a shape of the second target object O2 may be similar to a shape of the first target object O1, so that the object classifying and tracking method can be applied to identify and decide whether the first target object O1 within the first image I1 and the second target object O2 within the second image I2 belong to the same tracking object.

In the embodiment, step S100 can be executed and the object classifying and tracking method can utilize the object identification technology, such as CNN, to respectively detect the first target object O1 within the first image I1 and the second target object O2 within the second image I2, and then acquire the first attribute feature A1, the first position feature P1 and the first classify feature C1 of the first target object O1, and further acquire the second attribute feature A2, the second position feature P2 and the second classify feature C2 of the second target object O2. The first position feature P1 can be position information of the first target object O1 within the first image I1. The second position feature P2 can be position information of the second target object O2 within the second image I2. Then, the object classifying and tracking method can utilize the object identification technology, such as CNN, to acquire the first dependent feature D1 of the first target object O1 via the first classify feature C1, and further acquire the second dependent feature D2 of the second target object O2 via the second classify feature C2.

For example, a score of the first target object O1 within the first image I1 can be calculated by formula 1, and a score of the second target object O2 within the second image I2 can be calculated by formula 2. Symbols α, β and γ can be weighting of the features, and can be set in accordance with parameters and surveillance surroundings of the surveillance camera 10, and the detailed description is omitted herein for simplicity. If the object classifying and tracking method identifies that the first classify feature C1 is the human, the first dependent feature D1 can be indicated as D1=[1.0 (human), 0(cloth), 0(vehicle)]; if the object classifying and tracking method identifies that the second classify feature C2 is the clothing, the second dependent feature D2 can be indicated as D2=[0(human), 0.9(cloth), 0(vehicle)]. Classify values of each classify feature (such as three classify features of the human, the clothing and the truck) of the first dependent feature D1 and the second dependent feature D2 can depend on an identification result of the surveillance camera 10.

$$ScoreO1\_I1 = \alpha*A1 + \beta*P1 + \gamma*C1 \rightarrow \alpha*A1 + \beta*P1 + \gamma*D1 \quad \text{Formula 1}$$

$$ScoreO2\_I2 = \alpha*A2 + \beta*P2 + \gamma*C2 \rightarrow \alpha*A2 + \beta*P2 + \gamma*D2 \quad \text{Formula 2}$$

Then, step S102 can be executed and the object classifying and tracking method can determine whether the first target object O1 stays in a range of the first position feature P1 within the second image I2. If the first target object O1 is appeared in the first position feature P1 within the second image I2, the second target object O2 within the second image I2 and the first target object O1 within the first image I1 do not belong to the same tracking object, and therefore step S104 can be executed to keep tracking a moving path of the first target object O1 within the second image I2; meanwhile, the object classifying and tracking method may not obtain the dependent degree of the first classify feature C1 and the second classify feature C2. If the first target object O1 is not appeared in the first position feature P1 within the second image I2, the object classifying and tracking method may temporarily miss the first target object O1, and the second target object O2 within the second image I2 and the first target object O1 within the first image I1 may belong to the same tracking object; then, step S106 can be executed to search the dependent degree of the first classify feature C1 and the second classify feature C2 from the dependent table.

In other possible embodiment, the present application may further analyze the first position feature P1 and the second position feature P2, so as to replace step S102 and determine whether to search the dependent degree of the first classify feature C1 and the second classify feature C2 from the dependent table. For example, if the first position feature P1 is different from the second position feature P2, but a difference between the first position feature P1 and the second position feature P2 is smaller than a predefined value, a region of the first target object O1 within the first image I1 is very close to a region of the second target object O2 within the second image I2, so that the first target object O1 and the second target object O2 may belong to the same tracking object; in the meantime, the object classifying and tracking method can still execute step S106 to search the dependent degree of the first classify feature C1 and the second classify feature C2 from the dependent table when analyzing that the first classify feature C1 and the second classify feature C2 belong to different types but conform to a high dependent condition, such as the human and the clothing being different classify features but conforming to the high dependent condition.

The foresaid preset value can be set manually by the user, or automatically computed by the surveillance camera 10. If a difference between the first position feature P1 and the second position feature P2 is greater than or equal to the predefined value, or the difference between the first position feature P1 and the second position feature P2 is smaller than the predefined value but the first classify feature C1 and the second classify feature C2 respectively belong to different types in a low dependent condition (for example, the human and the truck are different classify features and conform to the low dependent condition), the first target object O1 and the second target object O2 cannot be the same tracking object, and the object classifying and tracking method does not search the dependent degree of the first classify feature C1 and the second classify feature C2 from the dependent table.

Moreover, the object classifying and tracking method of the present application can determine whether a difference between the first dependent value of the first dependent feature D1 and the second dependent value of the second dependent feature D2 in different type results is within a predefined range. For example, the first dependent value of the first dependent feature D1 in the human type can be defined as D1=[1.0(human)], and the second dependent value of the second dependent feature D2 in the clothing type can be defined as D2=[0.9(cloth)]; the predefined range can be manually set or automatically computed by the surveillance camera 10 and can be 0.2 or other values. If the difference of the first dependent value and the second dependent value in different type results is not in the predefined range, the first target object O1 and the second target object O2 cannot be the same tracking object, and the object classifying and tracking method does not search the dependent degree of the first classify feature C1 and the second classify feature C2 from the dependent table; if the difference between the first dependent value and the second dependent value in different type results is in the predefined range, the first target object O1 and the second target object O2 can belong to the same tracking object, and step S106 can be executed to search the dependent degree of the first classify feature C1 and the second classify feature C2 from the dependent table.

Therefore, the object classifying and tracking method of the present application can analyze at least one of the position feature and the dependent feature of the target object, to determine possibility of the first target object O1 and the second target object O2 belonging to the same tracking object. If the possibility is low, the object classifying and tracking method does not obtain the dependent degree and not execute transformation of the dependent feature for decreasing systematic computation. If the possibility is high, the object classifying and tracking method can obtain the dependent degree and then execute the transformation of the dependent feature, so as to ensure that the surveillance camera 10 can acquire an accurate object identification result.

Then, step S108 can be executed to transform the second dependent feature D2 via the dependent degree. As the following dependent table, the object classifying and tracking method can find out that the dependent degree of the first classify feature C1 (such as the human) and the second dependent feature D2 (such as the clothing) is equal to 0.8. The object classifying and tracking method can compute a product of the dependent degree and a dependent value of the second dependent feature D2 in the corresponding specific type result, and the computed product can be used as the transformed dependent value of the transformed second dependent feature in another specific type result. For example, the second dependent feature D2 may be originally represented as D2=[0(human), 0.9(cloth), 0(vehicle)], and the second classify feature C2 is the clothing, so that a product of the dependent degree (such as 0.8) and the dependent value (such as 0.9) in this type can be computed and interpreted as the second dependent feature D2'; the second dependent feature D2' can be represented as D2'= [0.9*0.8(human), 0(cloth), 0(vehicle)]. The foresaid another type result can be the type result (such as the human) of the first classify feature C1, and its transformed dependent value can be equal to the foresaid product as being 0.9*0.8 (such as the human).

Dependent table

| Item | Human | Clothing | Truck |
| --- | --- | --- | --- |
| Human | 1 | 0.8 | 0 |
| Clothing | 0.8 | 1 | 0 |
| Truck | 0 | 0 | 1 |

The dependent degree of each item in the dependent table can be set in accordance with the feature ratio. For example, the upper body of the human can have features as the head, the hand and so on, and the clothing wore on the human usually accounts a large proportion of a human body, so that similarity and the dependency of the clothing and the human are high. In addition, features of the truck are obviously different from the head or the hand of the human, and the similarity and the dependency of the truck and the human are low. Therefore, the dependent table can determine the dependent degree of each item in accordance with specific regional proportions of different classify features. The present application can manually set a threshold by the foresaid proportions, or utilize image analysis technology to automatically compute the specific regional proportions of several samples for setting the dependent degree, or utilize unsupervised machine learning technology to acquire a feature distance of each classify feature for computation of the dependent degree.

For example, the unsupervised machine learning technology can search a plurality of learned features F of the first classify feature C1, the second classify feature C2 and a third classify feature (such as the truck). The learned feature F1(F) can be the sleeve, the learned feature F2(F) can be the collar, the learned feature F3(F) can be the face, and the learned feature F4(F) can be the tire. Thus, a feature distance between the first classify feature C1 and the second classify feature C2 is short, and the first classify feature C1 and the second classify feature C2 can have greater similarity. The present application can compute a projection length of the feature vector of each classify feature or an included angle between the feature vectors of the classify features for acquiring the dependent degree of different classify features.

This embodiment can provide an example of the first type (such as the human) and the second type (such as the clothing), and any other possible types can be applied in accordance with the identification result executed by step S100 of the object classifying and tracking method, which means the first type and the second type can be the human and the truck, or may be the clothing and the truck, and the detailed description is omitted herein for simplicity. It should be mentioned that when the second classify feature C2 belongs to the clothing, the object classifying and tracking method may identify the second target object O2 as being similar to the human, so that the second dependent feature D2 can have the dependent value containing the first type (such as the human) and the second type (such as the clothing); for example, D2=[0.1(human), 0.9(cloth), 0(vehicle)]. In the situation, step S108 can be executed to compute a transformation value of the dependent degree and the second type dependent value of the second dependent feature D2, and the computed transformation value can be used as the first type dependent value of the transformed second dependent feature D2'; for example, D2'=[0.9*0.8 (human), 0(cloth), 0(vehicle)]. In the meantime, the second type dependent value of the transformed second dependent feature D2' can be set as zero, or another transformation value computed by the dependent degree and the first type dependent value of the second dependent feature D2 can be set as the second type dependent value of the transformed second dependent feature D2''; for example, D2''=[0.9*0.8 (human), 0.1*0.8(cloth), 0(vehicle)].

Then, step S110 can be computed and the object classifying and tracking method can analyze a difference between the first dependent feature D1 and the transformed second dependent feature D2' or D2'', to determine whether the first target object O1 and the second target object O2 are the same tracking object. For example, the first type dependent value of the first dependent feature D1 may be set as 1.0 (such as human), and the first type dependent value of the transformed second dependent feature D2' or D2'' may be set as 0.9*0.8 (such as the human). If the difference between the two first type dependent values of different dependent features is greater than or equal to a preset threshold, the first target object O1 and the second target object O2 are determined as not the same tracking object; if the difference between the two first type dependent values of different dependent features is smaller than the preset threshold, the first target object O1 and the second target object O2 can be determined as the same tracking object. An actual value of the preset threshold can be manually set by the user or automatically computed by the surveillance camera 10, and the detailed description is omitted herein for simplicity.

If the first target object O1 and the second target object O2 are not the same tracking object, step S112 can be executed and the surveillance camera 10 does not modify the type result of the first classify feature C1 and the second classify feature C2; the object classifying and tracking method of the present application can detect the first target object O1 is similar to the second target object O2, but still can determine the first target object O1 and the second target object O2 are not the same tracking object. If the first target object O1 and the second target object O2 are the same tracking object, step S114 can be executed and the object classifying and tracking method can modify the type result of the second classify feature C2; for example, the second target object O2 can be changed from the type of clothing to the type of human. When the object classifying and tracking method acquires the third image for the object identification, the dependent degree of the type of human and another type (which depends on the classify feature of the third image) can be searched from the dependent table for related computation.

Further, step S114 can further optionally maintain the type result of the second classify feature C2, such as the second target object O2 being set as the type of clothing. When the object classifying and tracking method acquires the third image for the object identification, the dependent degree of the type of clothing and another type (which depends on the classify feature of the third image) can be searched from the dependent table for related computation.

Figure 6:
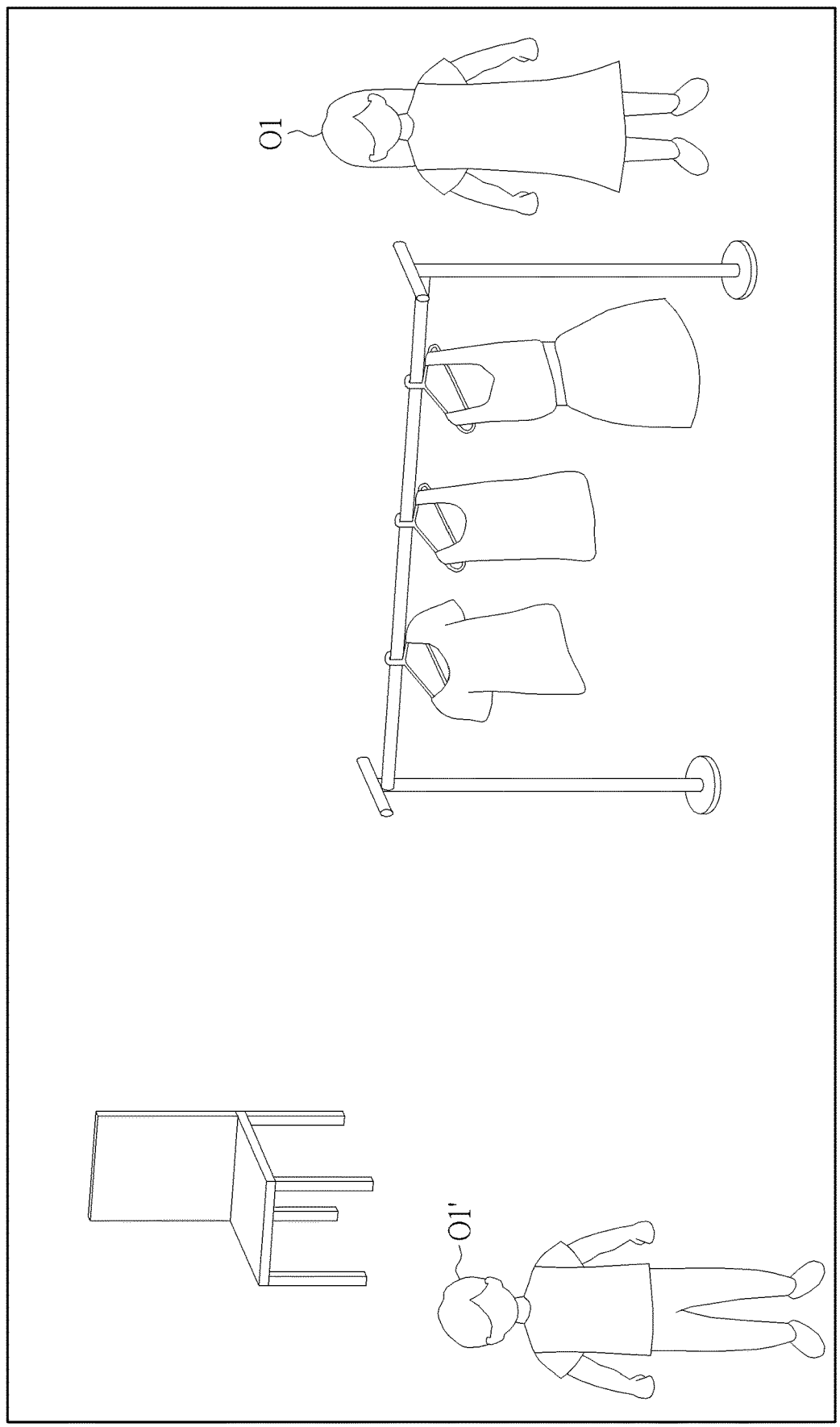
FIG. 6 is a diagram of the surveillance image acquired by the surveillance camera installed on the interior space according to another embodiment of the present application.

The foresaid embodiment is related to the object classifying and tracking method executed in a condition that the surveillance camera 10 of the present application detects one first target object O1 within the first image I1; however, a number of the target object may be plural. Please refer to FIG. 6. FIG. 6 is a diagram of the surveillance image I1' acquired by the surveillance camera 10 installed on the interior space according to another embodiment of the present application. If the surveillance camera 10 detect a plurality of first target objects O1 and O1' within the first image I1', the surveillance camera 10 can apply the foresaid object classifying and tracking method for the first target object O1, and then can further acquire the attribute feature, the position feature, the classify feature and the dependent feature of the first target object O1', and acquire the dependent degree of the classify feature of the first target object O1' and the second classify feature C2 of the second target object O2 within the second image I2; the dependent degree can be transformed into the second dependent feature D2, for determining whether the first target object O1' and the second target object O2 are the same tracking object. Transformation and identification of the dependent feature can be similar to the embodiment of the first target object O1, and the detailed description is omitted for simplicity.

It should be mentioned that the object classifying and tracking method of the present application can be applied for the object identification in two or more types, such as the first type of human, the second type of clothing, and the third type of truck. If the object classifying and tracking method utilizes the first classify feature C1 and the second classify feature C2 to determine type dependency of the first target object O1 and the second target object O2 belongs to the dependency of the human and the clothing in step S100, the object classifying and tracking method can extract the dependent degree relevant to the first type (such as the human) and the second type (such as the clothing) from the dependent table optionally, which means the dependent degree of the human and the truck and the dependent degree of the clothing and the truck are not used to compute the first dependent feature D1 and the second dependent feature D2. Besides, even if the dependent degree of the human and the truck and the dependent degree of the clothing and the truck are extracted from the dependent table, the object classifying and tracking method can still exclude dependent feature transformation of the first dependent feature D1 and the second dependent feature D2 relevant to the third type (such as the truck); the dependent feature transformation of the human and the truck, and of the clothing and the truck are not computed for reducing the systematic computation and improving identification speed.

The surveillance camera 10 can further include an input interface 18 electrically connected to the operation processor 16. The input interface 18 can be a touch display, a mouse, a keyboard, or any element having similar functions. In other possible embodiment, the user can manually input a selection command via the input interface 18 to set that the first target object O1 belongs to the first type (such as the human), the second type (such as the clothing) or the third type (such as the truck), and the object classifying and tracking method of the present application can automatically exclude irrelevant dependent information in accordance with a selection result. For example, if a condition of the first target object O1 belonging to the first type (such as the human) is manually selected by the user, the surveillance camera 10 can focus on the selected object, the dependent information of the clothing and the truck irrelevant to the first type (such as the human) can be automatically excluded, so as to provide an aim of reducing the systematic computation and improving the identification speed.

In conclusion, the object classifying and tracking method and the surveillance camera of the present application can utilize the dependent degree in different types to transform and acquire the dependent feature of different target objects, so as to determine plural results of the object identification with similar shape belong to the same type or different types, for preferred object classification and accurate tracking result. Comparing to the prior art, the object classifying and tracking method and the surveillance camera of the present application do not need complicated computation and extensive data storage, and therefore can accurately identify the objects that have similar shapes but are in different types, such as difference between the container and the truck, or difference between the human and the clothing on the stand, so as to provide the object classifying and tracking result rapidly and accurately.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An object classifying and tracking method applied for object identification of an image stream, the object classifying and tracking method comprising:
   an operation processor acquiring a first classify feature and a first dependent feature of a first target object within a first image of the image stream and a second classify feature and a second dependent feature of a second target object within a second image of the image stream;
   the operation processor computing a pixel number ratio of the first classify feature to the second classify feature so as to set as a dependent degree and store in a memory;
   the operation processor acquiring the dependent degree of the first classify feature and the second classify feature from the memory;
   the operation processor utilizing the dependent degree to transform the second dependent feature; and
   the operation processor analyzing the first dependent feature and the transformed second dependent feature to determine whether the first target object and the second target object are the same tracking object.

2. The object classifying and tracking method of claim 1, further comprising:
   the operation processor acquiring a first position feature of the first target object within the first image; and
   the operation processor executing transformation of the second dependent feature via the dependent degree when the first target object does not conform to the first position feature within the second image.

3. The object classifying and tracking method of claim 1, further comprising:
   the operation processor acquiring a first position feature of the first target object within the first image, and a second position feature of the second target object within the second image; and
   the operation processor utilizing the dependent degree to execute transformation of the second dependent feature when a difference between the first position feature and the second position feature is smaller than a predefined value and the first dependent feature and the second dependent feature belong to different types but conform to a high dependent condition.

4. The object classifying and tracking method of claim 1, further comprising:
the operation processor determining whether a difference of a first dependent value of the first dependent feature and a second dependent value of the second dependent feature in different types is in a predefined range; and
the operation processor acquiring the dependent degree to execute transformation of the second dependent feature when the difference is in the predefined range.

5. The object classifying and tracking method of claim 1, wherein the operation processor computes a product of the dependent degree and a dependent value of a specific type result of the second classify feature, and utilizes the foresaid product to be a transformed dependent value of another specific type result of the transformed second classify feature.

6. The object classifying and tracking method of claim 1, wherein the object classifying and tracking method is applied for the object identification in a first type and a second type, the second classify feature has a first type dependent value and a second type dependent value, the operation processor utilizing the dependent degree to transform the second dependent feature comprising:
the operation processor computing a transformation value of the dependent degree and the second type dependent value of the second classify feature so as to set as the first type dependent value of the transformed second dependent feature.

7. The object classifying and tracking method of claim 1, wherein the operation processor computes a difference between a dependent value of the first dependent feature and a corresponding dependent value of the transformed second dependent feature, and determines the first target object and the second target object are the same tracking object when the foresaid difference is smaller than a threshold.

8. The object classifying and tracking method of claim 1, further comprising:
the operation processor modifying a type result of the second classify feature when the first target object and the second target object are the same tracking object.

9. The object classifying and tracking method of claim 1, further comprising:
the operation processor acquiring a corresponding classify feature and a corresponding dependent feature of another target object within the first image; and
the operation processor acquiring another dependent degree of the corresponding classify feature and the second classify feature so as to transform the second dependent feature and further to determine whether the first target object and the second target object are the same tracking object.

10. The object classifying and tracking method of claim 1, wherein the object classifying and tracking method is applied for the object identification in a first type, a second type and a third type, the object classifying and tracking method further comprises:
the operation processor not computing dependent feature transformation of the first dependent feature and the second dependent feature relevant to the third type when the first target object and the second target object belong to dependency of the first type and the second type.

11. The object classifying and tracking method of claim 1, wherein the object classifying and tracking method is applied for the object identification in a first type, a second type and a third type, the object classifying and tracking method further comprises:
the operation processor only acquiring the dependent degree relevant to the first type and the second type for dependent feature transformation when the first target object and the second target object belong to dependency of the first type and the second type.

12. The object classifying and tracking method of claim 1, wherein the object classifying and tracking method is applied for the object identification in a first type, a second type and a third type, information of the dependent degree about the first type, the second type and the third type is stored in the memory, the object classifying and tracking method further comprises:
the operation processor selecting that the first target object belongs to the first type, the second type or the third type in accordance with a selection command generated by an input interface; and
the operation processor excluding some information of the dependent degree irrelevant to the first type when the first target object belongs to the first type.

13. The object classifying and tracking method of claim 1, further comprising:
the operation processor computing a vector included angle between a first attribute feature of the first target object and a second attribute feature of the second target object or a vector length of the first attribute feature or the second attribute feature so as to set as the dependent degree and store in the memory.

14. A surveillance camera with an object classifying and tracking function, comprising:
an image receiver adapted to receive an image stream;
a memory adapted to store a dependent table having at least one dependent degree about a plurality of target objects; and
an operation processor electrically connected to the image receiver and the memory, the operation processor receiving the image stream from the image receiver to acquire a first classify feature and a first dependent feature of a first target object within a first image of the image stream and a second classify feature and a second dependent feature of a second target object within a second image of the image stream, computing a pixel number ratio of the first classify feature to the second classify feature so as to set as a dependent degree and store in the memory, searching the memory to acquire the dependent degree of the first classify feature and the second classify feature from the memory by the dependent table, performing digital transformation of the second dependent feature by the dependent degree, and analyzing difference between the first dependent feature and the transformed second dependent feature to determine whether the first target object and the second target object are the same tracking object.

15. The surveillance camera of claim 14, wherein the operation processor further acquires a first position feature of the first target object within the first image and a second position feature of the second target object within the second image, and utilizes the dependent degree to execute transformation of the second dependent feature when a difference between the first position feature and the second position feature is smaller than a predefined value and the first dependent feature and the second dependent feature belong to different types but conform to a high dependent condition.

16. The surveillance camera of claim 14, wherein the operation processor further determines whether a difference of a first dependent value of the first dependent feature and a second dependent value of the second dependent feature in different types is in a predefined range, and acquires the dependent degree to execute transformation of the second dependent feature when the difference is in the predefined range.

17. The surveillance camera of claim 14, wherein the surveillance camera is applied for the object identification in a first type and a second type, the second classify feature has a first type dependent value and a second type dependent value, the operation processor further computes a transformation value of the dependent degree and the second type dependent value of the second classify feature so as to set as the first type dependent value of the transformed second dependent feature.

18. The surveillance camera of claim 14, wherein the operation processor further acquires a corresponding classify feature and a corresponding dependent feature of another target object within the first image, and acquires another dependent degree of the corresponding classify feature and the second classify feature to transform the second dependent feature and further so as to determine whether the first target object and the second target object are the same tracking object.

19. The surveillance camera of claim 14, wherein the surveillance camera is applied for the object identification in a first type, a second type and a third type, information of the dependent degree about the first type, the second type and the third type is stored in the memory, the operation processor further selects that the first target object belongs to the first type, the second type or the third type in accordance with a selection command generated by an input interface of the surveillance camera, and excludes some information of the dependent degree irrelevant to the first type when the first target object belongs to the first type.

20. An object classifying and tracking method applied for a surveillance camera having an image receiver, a memory and an operation processor, the object classifying and tracking method comprising:
    an operation processor receiving an image stream from the image receiver to acquire a first classify feature and a first dependent feature of a first target object within a first image of the image stream and a second classify feature and a second dependent feature of a second target object within a second image of the image stream;
    the operation processor computing a pixel number ratio of the first classify feature to the second classify feature so as to set as a dependent degree and store in the memory;
    the operation processor searching the memory to acquire the dependent degree of the first classify feature and the second classify feature;
    the operation processor performing digital transformation of the second dependent feature by the dependent degree; and
    the operation processor analyzing difference between the first dependent feature and the transformed second dependent feature to determine whether the first target object and the second target object are the same tracking object.

* * * * *